United States Patent [19]

Meyer

[11] 3,911,252

[45] Oct. 7, 1975

[54] TOKEN READER

[75] Inventor: Svend Scheel Meyer, Gloucestershire, England

[73] Assignee: Group 4 Total Security Limited, Worcestershire, England

[22] Filed: Dec. 26, 1973

[21] Appl. No.: 428,900

[30] Foreign Application Priority Data

Dec. 29, 1972 United Kingdom ............... 60182/72

[52] U.S. Cl. .................... 235/61.11 D; 235/61.11 D

[51] Int. Cl. ............................................. G06k 7/08

[58] Field of Search ......... 235/61.11 D; 340/174 M; 324/34 R, 43 R

[56] References Cited

UNITED STATES PATENTS

| | | | |
|---|---|---|---|
| 3,015,087 | 12/1961 | O'Gorman | 340/174 |
| 3,210,527 | 10/1965 | Daykin | 340/174 |
| 3,310,789 | 3/1967 | Steinbuch et al. | 235/61.11 D |
| 3,564,214 | 2/1971 | Cooper, Jr. | 235/61.11 D |
| 3,602,697 | 8/1971 | Tanaka et al. | 235/61.11 D |

*Primary Examiner*—Vincent P. Canney
*Attorney, Agent, or Firm*—Waters, Schwartz & Nissen

[57] ABSTRACT

The token reader comprises an array of magnetic field detecting means, magnetic field producing means, and a zone for receiving a token having an array of elements for reducing magnetic coupling between the producing means and certain ones of the detecting means. In use of the reader, when such a token is in the zone, the reader produces an array of signals corresponding to the arrangement of elements of the token.

11 Claims, 7 Drawing Figures

TOKEN READER

BACKGROUND OF THE INVENTION

1. Field of Invention

The invention relates to a token reader for reading tokens. By "token" we mean an article, for example in the form of a card, which conveys information. The invention is applicable to apparatus for checking the validity of this information, as in a security system.

2. Description of Prior Art

In a known credit vending system (British Pat. No. 959,713) information relating to the identity of a subscriber to the system is carried on a check by means of a set of punched holes, which are of course readily visible and therefore easy to copy. To make forgery more difficult (but on the other hand complicating the token reader) means for facilitating checking the validity of the check are also provided on the card. These means may for example be a diffraction grating disposed in a transparent portion of the check. The grating characterizes light transmitted through the portion, which light is detected by suitable means.

An object of the present invention is to produce a relatively simple token reader which is such that a suitable token therefor can be designed so that it is less capable of being forged.

SUMMARY OF THE INVENTION

The token reader comprises: means for producing a dynamic magnetic field; an array of magnetic field detecting means each able to produce a signal in response to the changes in said field; and a receiving zone for receiving a token having magnetic field reducing means for reducing the magnetic coupling between the field producing means and certain ones of the detecting means in dependence upon the arrangement of the magnetic field reducing means whereby, when such a token is in said zone, the signals produced by the detecting means correspond to the arrangement of the magnetic field reducing means of the token.

In accordance with specific embodiments of the token reader, each of the magnetic field detecting means may comprise a substantially planar spiral coil of conductive material arranged on an insulative support. The magnetic field producing means may comprise a winding having a plurality of turns encircling a region substantially coextensive with the array of field detecting means, the winding being operable to produce a magnetic field which is directed in substantially the same direction, at any moment in time, at the region.

The arrangement of the said magnetic field affecting means at the token represent a code and the said signals accordingly also represent that code.

An embodiment of the invention may additionally comprise a comparing means for comparing said signals with a reference supplied by a reference producing means, for instance a keyboard. The comparing means may be used to actuate a doorlock, for example, when said signals and the reference have a desired correspondence.

Instead of the comparing means directly controlling a doorlock, there may be provided an analysis means which stores a list of codes. Signals having desired correspondence with the reference as determined by the comparing means are fed to the analysis means, or vice versa. If the code represented by these signals is determined to be unacceptable, i.e. the code is found (or not found) the list of codes in the analysis means, a signal of rejection of the token is produced.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION OF THE INVENTION

Figure 1:
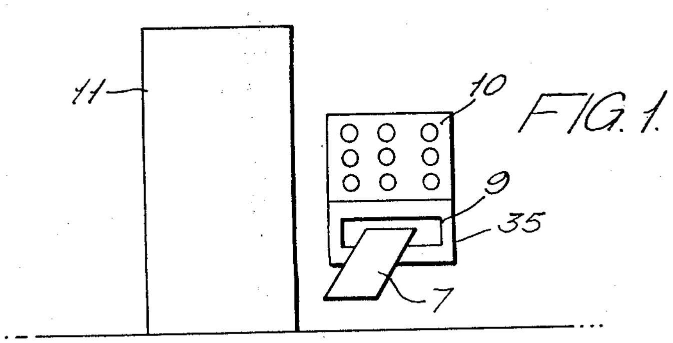
FIG. 1 shows a security system including a token reader.
Figure 2:
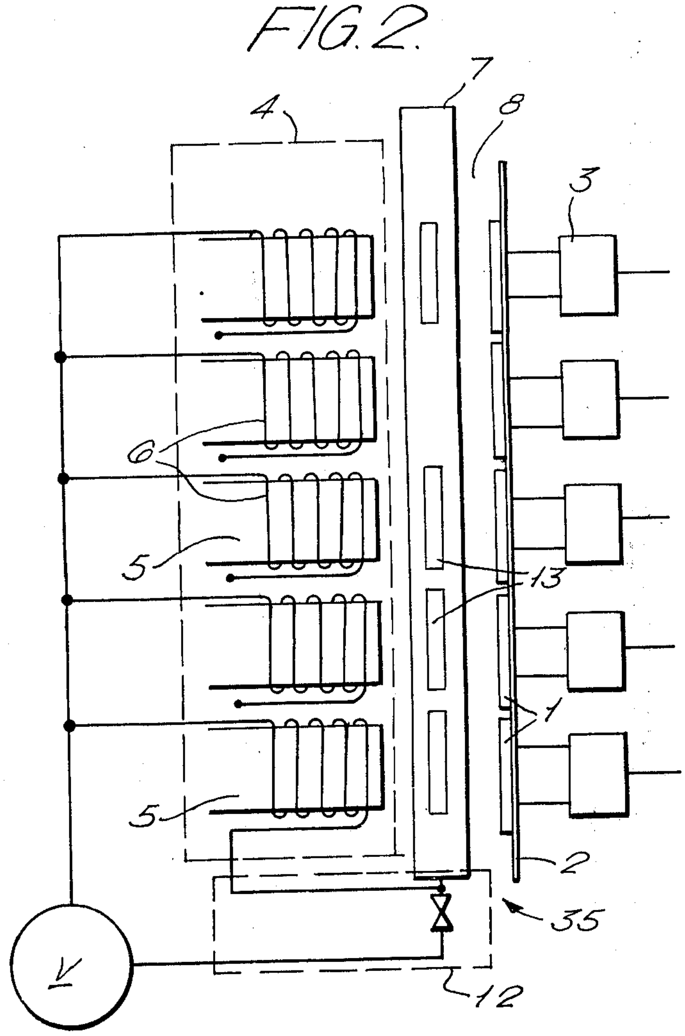
FIG. 2 shows a side view of a first embodiment of a token reader with a token inserted.

FIG. 1 illustrates a security system incorporating a token-reader 35. A person wishing to open a locked door 11 inserts a token 7 into the slot 9 and uses a keyboard 10 to enter an identity or reference number. A code or number encoded on the token 7 is compared with the identity or reference number entered on the keyboard and if the correct relationship is established, the lock on the door 11 is released.

Figure 3:
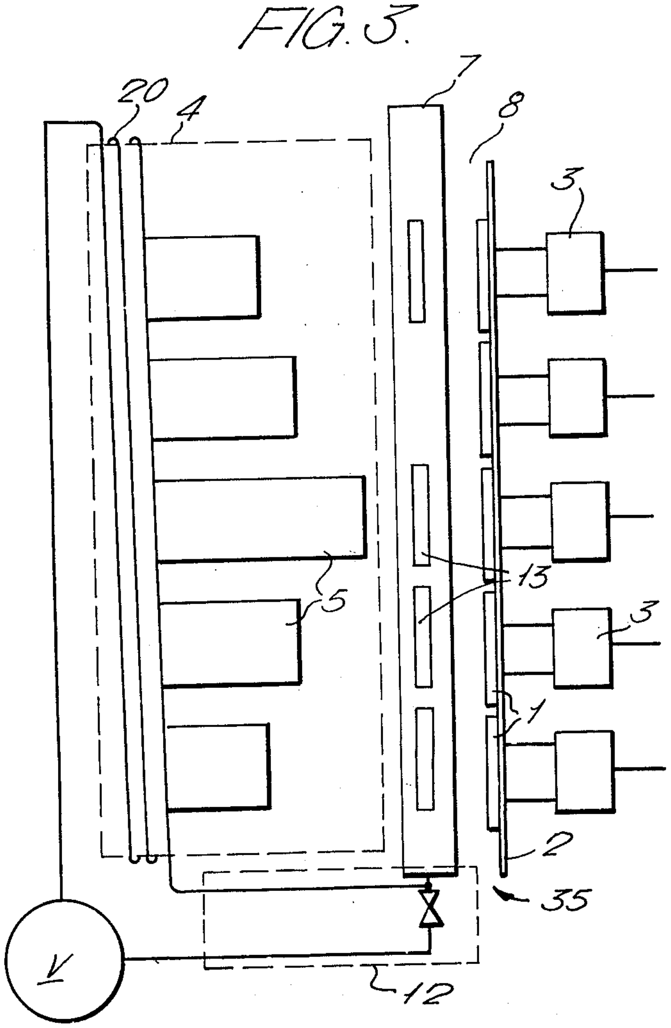
FIG. 3 shows a side view of an alternative embodiment of the token reader with a token inserted.
Figure 4:
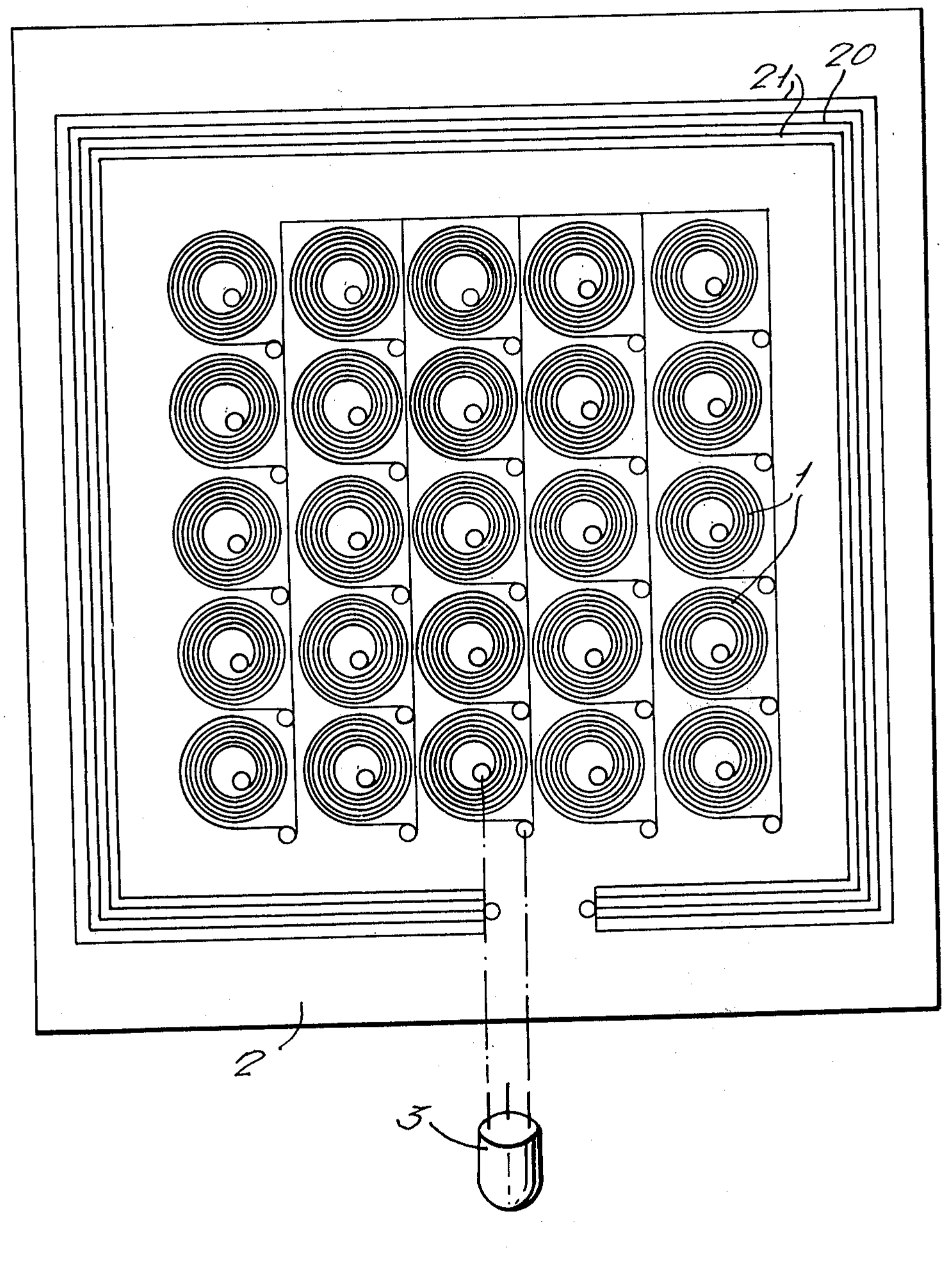
FIG. 4 shows a detail of another embodiment of the token reader.

The token reader 35 comprises means 4 for producing a dynamic, i.e. varying, magnetic field and, as illustrated diagrammatically in FIG. 4 an array of magnetic field detecting means 1, which is preferably a five by five array. Each detecting means 1 is in the form of a seven-turn planar spiral coil 1 printed on a printed circuit board 2. In the first embodiment of the token reader the magnetic field producing means 4 comprises a plurality, one for each coil, of magnetic cores 5. The cores 5 are energised by respective windings 6 which are connected together, e.g. in parallel, in order simultaneously to produce magnetic fields of substantially the same strength in the respective cores 5. In the alternative embodiment of the invention, as shown in FIG. 3, the magnetic field producing means comprises a plurality of magnetic cores 4, and a common energising winding 20 wound around the cores 4.

In the embodiment of the token reader shown in FIG. 4 the energising winding 20 is printed onto the printed circuit board 2 in the form of five conductive strips connected in parallel.

In the embodiments of FIGS. 3 and 4, the cores 5 are of different, predetermined, lengths the cores being so arranged that the strengths of the magnetic field portions produced in a receiving zone 8 between the cores and the coils 1 would, in use of the reader in absence of a token, be substantially equal. The dynamic magnetic field can induce currents in the respective coils 1. Coupled to each coil is a means for amplifying current induced in the coil by a change in the magnetic field produced by means 4. The current amplifying means is for example a transistor 3.

The token 7, which may be of plastics, is inserted into the receiving zone 8 between the cores and the coils 1. The magnetising windings 5 are energised only when a token is inserted into the receiving zone 8. The token reader is provided with a mechanical switch 12 to fulfill this purpose, although there could, instead, be provided equivalent means such as a photocell, or a magnetic reading head to sense a magnetic strip on the token when the token has been moved into the correct orientation. The number coded into the token 7 is produced in it by inserting into the token at selected locations pieces 13 of conductive or magnetic material, for example, aluminium. These pieces 13 prevent full magnetic coupling between the cores 5 and certain ones of the coils 1. The token 7 may also have extra inserts of substantially non-conductive or non-magnetic material which appear to be identical with the conductive or magnetic pieces 13 but which do not prevent full magnetic coupling. Thus, forgery may be made more difficult.

There may be guides and stops (not shown) in the receiving zone for positioning the card relative to the coils 1. When the token 7 is inserted into the receiving zone 8 substantially no current is induced in those coils 1 which have a piece 13 of magnetic or conductive material directly between them and the associated coils 5. The particular transistors which are energised in the presence of a token 7 thus identify that token, i.e. the energized transistors correspond to or represent, the number conveyed by the arrangement of the pieces 13.

The signals produced by the transistors 3, which signals constitute an array of signals representing the number in the token, are fed to an analysis arrangement (FIG. 5) comprising a comparing means 14 and a keyboard 10. In the case of the preferred embodiment of the token reader the array consists of 25 signals. Only 12 of these signals are fed to the analysis arrangement. These 12 signals represent the code number on the card. When a token has been inserted into the reader, a reference or identity number has to be entered on the keyboard 10 and compared with the number on the token in the comparing means.

Figure 5:
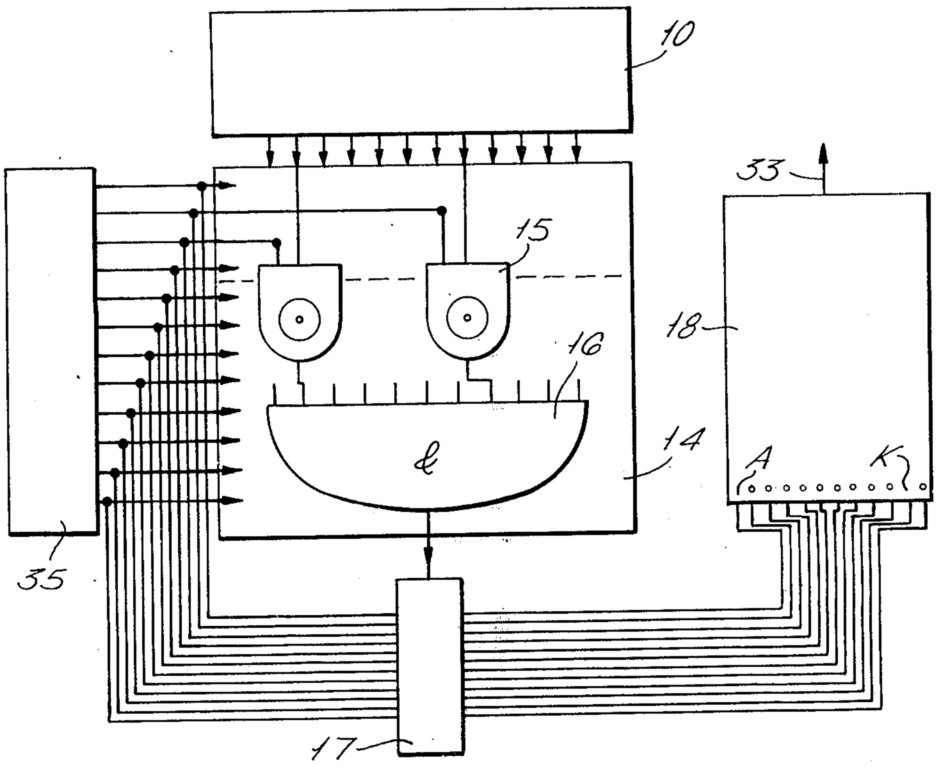
FIG. 5 shows a block diagram of an arrangement incorporating the token reader.

The comparing means 14 consists of a logic circuit comprising a plurality of coincidence gates 15 connected to an AND gate 16 (as shown in FIG. 5). In the comparing means 14 each signal from the reader 35 is compared with a corresponding signal from the keyboard 10. The token reader and the keyboard 10 can be so wired to the logic circuit that the correspondence is not direct. For instance, if the number on the token can be represented by a series of digits, and is compared with a reference number, entered on the keyboard 10, having the same number of digits, the wiring may be such that the first digit of the token number is compared in one coincidence gate 15 with, for example, the third reference number digit, the second token number digit is compared in another coincidence gate 16 with the last reference number digit, and so on. This "scrambling" of the wiring can be implemented using a specially wired plug, which can be changed easily. The wiring of the plug establishes the relationship between the respective digits of the reference and token numbers.

The comparing means 14 produces a signal in dependence upon the comparison. This comparison signal could be used to automatically actuate a lock for a door (as has been indicated for FIG. 1). However, this signal could be used to control a logic gate 17. When the signal is so used, the gate 17 is connected to receive the array of signals produced by the token reader. When the comparing means confirms that the relationship between the number on the token and the reference number holds, the comparison signal is fed to the gate 17. The array of signals representing the number on the token is then fed to an analysis means 18 operable to reject predetermined unacceptable numbers. The means 18 stores a "list" of unacceptable numbers, for comparison with the numbers on the tokens. Thus any tokens with unacceptable numbers can be rejected.

Figure 6:
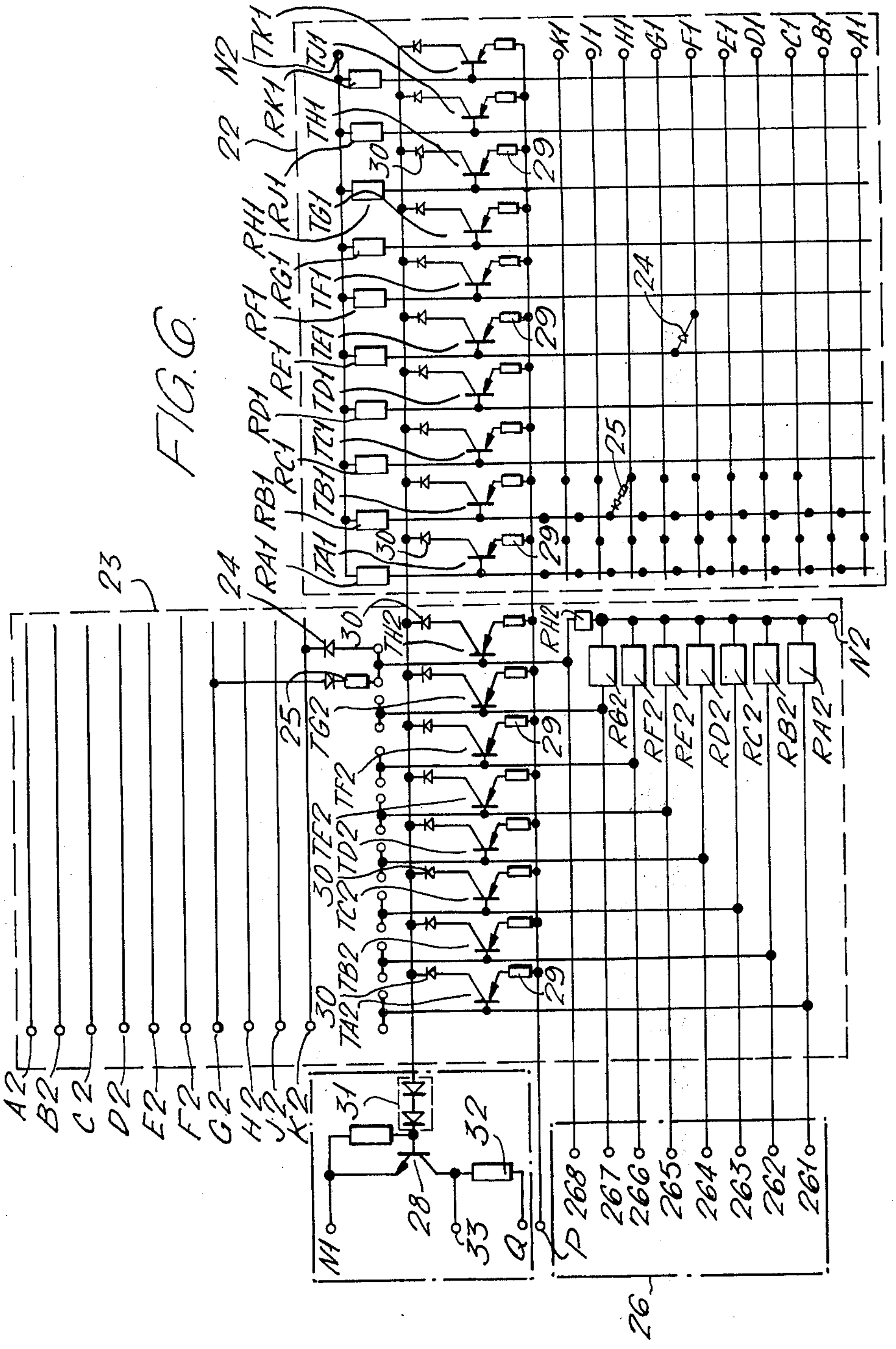
FIG. 6 shows a detail of the arrangement of FIG. 5.
Figure 7:
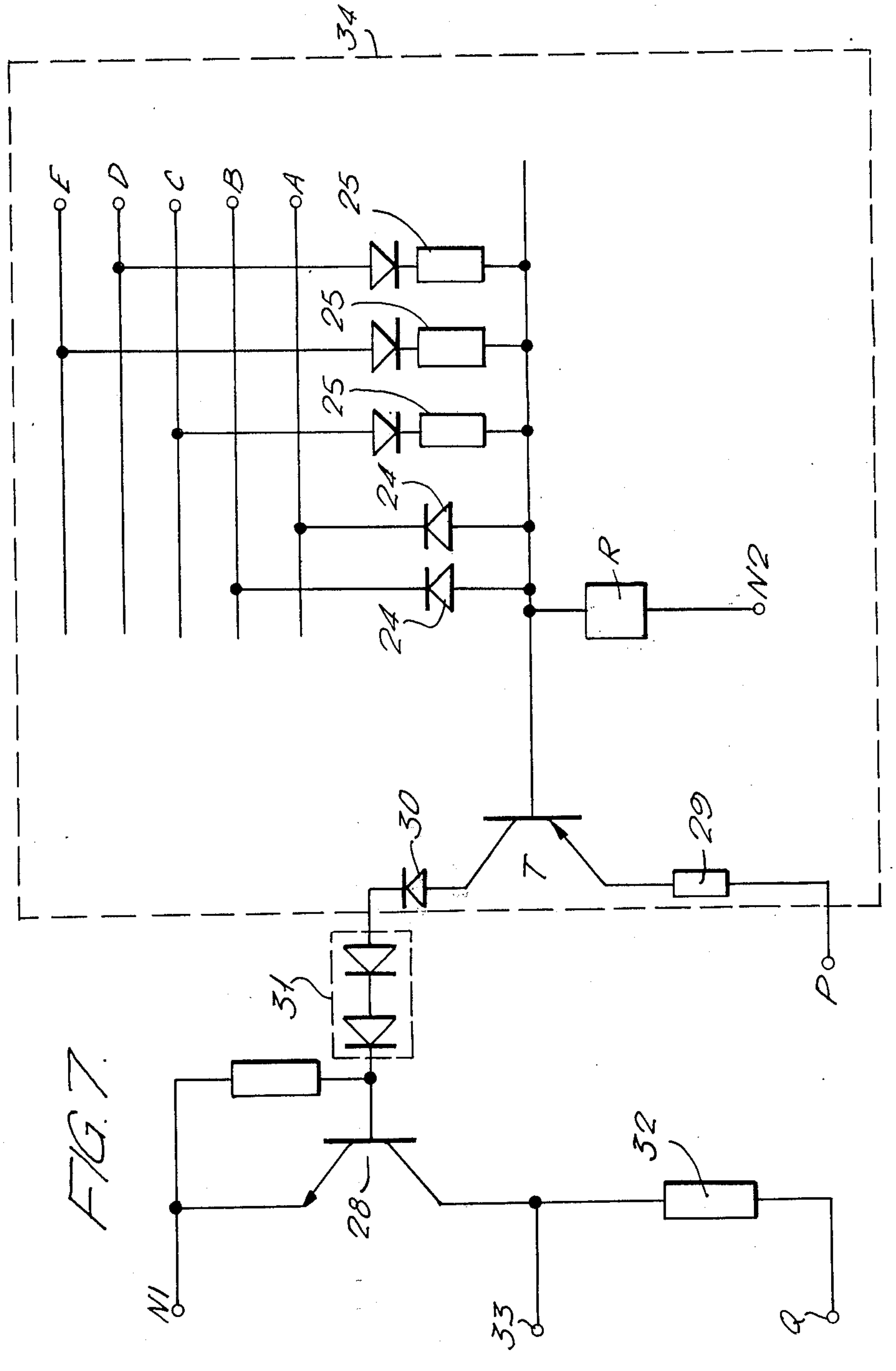
FIG. 7 shows a detail of FIG. 6.

An embodiment of the means 18 is shown in FIG. 6, and a detail of means 18 is shown in FIG. 7. The means 18 shown in FIG. 6 comprises two matrices 22 and 23 connected to control an N-P-N transistor 28. The emitter of transistor 28 is connected to a terminal N1 to which a voltage of −14V is applied and its collector is connected to an output terminal 33 and to a terminal Q via a resistor 32 there being a voltage of OV applied to terminal Q. Each matrix is constituted by a plurality of circuits 34 as shown within the closed short dash line of FIG. 7. Each circuit 34 comprises a P-N-P transistor T (denoted in FIG. 6 by TA1 . . . . TK1 or TA2 . . . TH2) the emitter of which is connected via a resistor 29 to a terminal P to which a voltage of −8V is applied. The collector of the transistor T is connected via a diode 30 and the series arrangement of two diodes 31 to the base of the N-P-N transistor 28. The base of the P-N-P transistor T is connected with a resistor R (denoted in FIG. 6 by RA1 . . . RA2 or RA1 . . . RH2) to a terminal N2 to which a voltage of −14V is applied. The base of transistor T may be connected to each one of the input lines A . . . . E . . of its associated matrix via either a diode 24 or a series arrangement 25 of a diode and a resistor. It is to be appreciated that a transistor T need not be connected to all, or even any, of the input lines.

The arrangement of diodes 24 and series arrangements 25 connecting a transistor to the input lines represents an unacceptable code number or a portion of an unacceptable code number.

The circuit 34 is adapted to operate as follows. The array of signals representing a number on a card are fed from the token reader to the input lines A . . . E . . . K. These signals are logic signals, logical 1 being represented by a voltage level of −14V and logical 0 being represented by a voltage level of 0V. The diodes 24 are non-conductive to logical 0 and the series arrangements 25 are non-conductive to a logical 1. If all the signals fed to the input lines A to E are blocked, i.e. they are not conducted by the diodes 24 and series arrangements 25, transistor T is conductive because of the −14V applied to its base via resistor R, and the N-P-N transistor 28 is also conductive. Thus a voltage of −14V (logical 1) is applied to the output terminal 33, and the token read by the token reader is rejected. If a logical 1 is applied to a series arrangement 25 or a logical 0 is applied to a diode 24 the transistor T becomes non-conductive and hence transistor 28 becomes non-conductive there being applied to the output terminal 33 a voltage of 0V(logical 0). In such a case the token read by the token reader is accepted.

It can be seen from the foregoing that the diodes 24 and series arrangements 25 of the matrices 22 and 23 represent, and block, sets of unacceptable numbers.

The matrix 22 represents and blocks a first set of unacceptable numbers, and matrix 23 is arranged to represent and block a second set of unacceptable numbers. Connected to the respective bases of the transistors TA2 . . . TH2 of the matrix 23 are terminals 261 to 268 of a programmer 26. The programmer is so arranged that it can control which number or numbers of the second set is or are unacceptable during a particular period of time. The analysis means is adapted to operate in the following manner. Let it be assumed that during a certain period of time TP1 a card carrying a code which is acceptable during only a different period of time TP2 has been put into the reader and a correct comparison between the code and the reference entered on the keyboard holds. The array of signals representing the code is fed to the matrices 22 and 23. At matrix 22 all the transistors TA1 . . . TK1, all of which transistor have initially been conductive, are rendered non-conductive by the array of signals. However at matrix 23 there is connected to the base of one transistor, TH2 for example, a diode 24 and a series arrangement 25 both of which block the signals applied to them. This transistor thus remains conductive, transistor 28 remains conductive, and a signal of rejection is produced. During the period of time TP2 the programmer 26 would have kept the transistor TH2 non-conductive.

What is claimed is:

1. A token reader comprising:

means for producing a dynamic magnetic field;

an array of coils, each constituted by a substantially planar spiral of conductive material arranged on a substantially planar insulative support, for producing respective signals in response to changes in the said field; and a receiving zone for receiving a token having magnetic field affecting means for reducing the magnetic coupling between the field producing means and certain ones of the coils in dependence upon the arrangement of the magnetic field affecting means, whereby, when such a token is in said zone, the signals produced by the respective coils correspond to the arrangement of the magnetic field affecting means of the token.

2. A token reader as recited in claim 1, wherein each detecting means of the array of detecting means comprises a means for amplifying current induced in the coil by the said changes of the magnetic field.

3. A token reader as recited in claim 1, wherein the means for producing a dynamic magnetic field comprises an array of magnetic cores and a winding arrangement for substantially simultaneously magnetically exciting the cores.

4. A token reader as recited in claim 3, wherein the winding arrangement comprises a common coil surrounding the array of magnetic cores, the magnetic cores being of such different lengths that the magnetic field at the said zone is substantially uniform in strength.

5. A token reader comprising:

an array of magnetic field detecting means for producing respective signals in response to changes in a magnetic field;

means for producing a dynamic magnetic field comprising a winding having a plurality of turns encircling a region substantially coextensive with the array of field detecting means, the winding being operable to produce throughout the region a magnetic field which is unidirectional at any moment in time; and a receiving zone for receiving a token having magnetic field affecting means for reducing the magnetic coupling between the field producing means and certain ones of the detecting means in dependence upon the arrangement of the affecting means, the zone having a portion co-extensive with the said array and arranged between the array and the producing means, whereby when such a token is in the said portion of the zone the signals produced by the respective coils correspond to the arrangement of the magnetic field affecting means of the token.

6. A token reader as recited in claim 5, wherein there is associated with the winding, a plurality of magnetic cores of such different lengths that the magnetic field at the said portion of the zone is substantially uniform in strength.

7. A token reader as recited in claim 5, wherein each detecting means of the array of magnetic field detecting means comprises a coil in the form of a substantially planar spiral of conductive material, the coils being arranged on a substantially planar insulative support.

8. A token reader as recited in claim 9, and further comprising means for manually setting up reference signals and means for comparing the reference signals with the said signals corresponding to the arrangement of the magnetic field reducing means of the token to produce a control signal in dependence upon the comparison.

9. A token reader as recited in claim 7, wherein each detecting means of the array of detecting means further comprises a means for amplifying current induced in its coil by the said changes of the magnetic field.

10. A token reader as recited in claim 9, and comprising a diode matrix comparator storing data defining predetermined arrangements of magnetic field affecting means of tokens and connected to receive the said signals to produce comparison signals in dependence upon the relationship between the said signals and the stored data, and switching means actuable in dependence upon the comparison signals to produce a signal of acceptance of a token if a desired relationship between the said signals and the stored data holds and to produce a signal of rejection of a token if the desired relationship does not hold.

11. A token reader as recited in claim 10, wherein the switching means comprises a plurality of switches having control electrodes connected in parallel, and wherein the diode matrix comparator comprises a plurality of output lines connected to the control electrodes of the respective switches, input lines for receiving respective ones of the said signals, and diodes connecting at least some of the input lines to at least some of the output lines, the arrangement of the diodes in the matrix representing the stored data.

* * * * *